(12) United States Patent
Iizuka et al.

(10) Patent No.: US 7,438,866 B2
(45) Date of Patent: Oct. 21, 2008

(54) EMISSION GAS PURIFICATION CATALYST AND INTERNAL COMBUSTION ENGINE PROVIDED WITH THE CATALYST

(75) Inventors: Hidehiro Iizuka, Hitachinaka (JP); Kojiro Okude, deceased, late of Hitachi (JP); by Mariko Okude, legal representative, Hitachi (JP); Masato Kaneeda, Hitachinaka (JP); Hisao Yamashita, Hitachi (JP); Yuichi Kitahara, Hitachinaka (JP); Osamu Kuroda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 874 days.

(21) Appl. No.: 10/470,830

(22) PCT Filed: Feb. 2, 2001

(86) PCT No.: PCT/JP01/00761

§ 371 (c)(1),
(2), (4) Date: Dec. 3, 2003

(87) PCT Pub. No.: WO02/062468

PCT Pub. Date: Aug. 15, 2002

(65) Prior Publication Data

US 2004/0115104 A1      Jun. 17, 2004

(51) Int. Cl.
 *B01D 50/00* (2006.01)
(52) U.S. Cl. .................... 422/180; 502/306
(58) Field of Classification Search ............... 422/168, 422/180; 502/304, 309, 319, 306; 423/213.5
See application file for complete search history.

(56) References Cited

U.S. PATENT DOCUMENTS 6,093,377 A * 7/2000 Iizuka et al. ............ 423/213.5

FOREIGN PATENT DOCUMENTS

| EP | 0387611 | 9/1990 |
|---|---|---|
| EP | 1 016 448 A1 | 7/2000 |
| EP | 1078678 | 2/2001 |
| EP | 1166853 | 1/2002 |
| JP | 49-21379 | 2/1974 |
| JP | 8-117600 | 5/1996 |
| JP | 9-248458 | 9/1997 |
| JP | 10-118458 | 5/1998 |
| JP | 2000-70717 | 3/2000 |
| JP | 2000-140638 | 5/2000 |
| JP | 2000-189799 | 7/2000 |
| JP | 2001-189799 | 7/2000 |
| JP | 2000-314311 | 11/2000 |
| JP | 2001-79405 | 3/2001 |

* cited by examiner

*Primary Examiner*—Tom Duong
(74) *Attorney, Agent, or Firm*—Mattingly, Stanger, Malur & Brundidge, P.C.

(57) ABSTRACT

A catalyst for use in purifying exhaust gas from an internal combustion engine. The active components of an exhaust gas purification catalyst for an internal combustion engine tend to be melted or softened and then to move outside the carrier, because the components become in contact with exhaust gas at a high temperature. Hence, anchoring materials are provided between carriers in order to suppress the moving of catalytically active components. Anchoring materials 22 do not form compounds with catalytically active components 24, and are selected from substances that do not melt even in contact with exhaust gas at a high temperature. When the active components contain sodium, potassium, cesium, lithium, strontium, barium, noble metals and the like, the best anchoring material is MgO. The anchoring material functions as a barrier that prevents the moving of active components.

7 Claims, 3 Drawing Sheets

EMISSION GAS PURIFICATION CATALYST AND INTERNAL COMBUSTION ENGINE PROVIDED WITH THE CATALYST

FIELD OF THE INVENTION

The present invention relates to an exhaust gas purification catalyst, which is preferable for purifying exhaust gas from the internal combustion engine of an automobile or the like. The present invention particularly relates to an exhaust gas purification catalyst for an internal combustion engine, which is preferable for purifying nitrogen oxides (NOx) contained in exhaust gas from the internal combustion engine that is operated in a lean atmosphere having an air-fuel ratio of 18 or more. The present invention further relates to an internal combustion engine provided with an exhaust gas purification catalyst, a method for purifying exhaust gas from an internal combustion engine, and a method for preparing the catalyst.

BACKGROUND OF THE PRESENT INVENTION

JP Patent Publication (Kokai) Nos. 2000-140638, 1997-248458, and 2000-189799 disclose a catalyst, which purifies exhaust gas from the internal combustion engine of an automobile or the like.

JP Patent Publication (Kokai) Nos. 2000-140638 and 1997-248458 disclose that when a catalyst containing elements acting as NOx-storaging materials, such as alkaline-earth metals or alkaline metals, is used in exhaust gas at a high temperature, a solid phase reaction occurs between porous carriers such as alumina and the element acting as an NOx-storaging material, so that the specific surface area of the carriers and the NOx-storaging ability are decreased. Further, it is also disclosed that to prevent a solid phase reaction from occurring between a carrier and an element acting as a NOx-storaging material, a composite oxide as represented by $MgO \cdot nAl_2O_3$, is used as a carrier. JP Patent Publication (Kokai) No. 2000-189799 discloses that a composite oxide carrier having the Spinel structure as represented by $M \cdot Al_2O_3$ (where M is an alkaline-earth metal) is used, so as to suppress the sintering of platinum composite oxides and thus to suppress the particle growth of platinum clusters.

A catalyst comprising alkaline metals and/or alkaline-earth metals such as sodium, potassium, lithium, cesium, strontium and barium has been expected to be useful as an exhaust gas purification catalyst for an internal combustion engine, particularly for an internal combustion engine that is operated in a lean atmosphere. If the catalyst's performance to purify exhaust gas can be enhanced, its usefulness is further increased.

We have studied catalysts containing alkaline metals or alkaline-earth metals, such as sodium, potassium, lithium, cesium, strontium and barium. Over the course of this study, we have confirmed that these alkaline metals or alkaline-earth metals tend to sinter at a high temperature, particularly at 800° C. or more. We have also revealed that a catalyst, wherein alkaline metals or alkaline-earth metals sinter, is no longer able to maintain its high performance of purifying nitrogen oxides (NOx).

An object of the present invention is to suppress sintering of the alkaline metals and/or the alkaline-earth metals in a catalyst comprising alkaline metals and/or alkaline-earth metals such as sodium, potassium, lithium, cesium, strontium and barium, with respect to not only the catalyst comprising alkaline metals and/or alkaline-earth metals, but also a catalyst comprising a component that causes sintering at a high temperature.

Another object of the present invention is to suppress the sintering.

SUMMARY OF THE INVENTION

According to the present invention, the move (transfer) of catalytically active components is prevented by allowing move-suppressing substances to exist between carriers that support catalytically active components.

The mechanism, wherein alkaline metals or alkaline-earth metals such as sodium, potassium, lithium, cesium, strontium and barium sinter at a high temperature, is inferred to be caused by generally the following i), ii) and iii):

i) Alkaline metals and alkaline-earth metals exist in catalysts mainly in the form of oxides, carbonates or amorphous composite oxides. Most of them exist in the form of fine particulate with particle sizes of less than 0.01 μm, and soften or melt when heated at a high temperature of 800° C. or more.

ii) The softened or melted alkaline metals or alkaline-earth metals sinter within the pores of carriers, and then they are transferred outside the carriers.

iii) The alkaline metals and alkaline-earth metals that have moved outside the carriers reach the surface of a substrate. When the material quality of the substrate comprises cordierite containing aluminum and silicon, the alkaline metals or alkaline-earth metals are diffused inside the cordierite. In addition, a phenomenon, wherein alkaline metals or alkaline-earth metals move outside the carriers and are diffused inside the substrate is hereinafter referred to as "alkali attack."

A catalyst containing alkaline metals or alkaline-earth metals is expected to be useful as an exhaust gas purification catalyst for an internal combustion engine, particularly in the case of so-called "lean-burn," that is, lean burning under an excess oxygen atmosphere.

A catalyst containing alkaline metals and/or alkaline-earth metals and noble metals, or further containing rare earth metals in addition to these metals, is known to storage (or store) NOx that is contained in exhaust gas from lean burning in the form of nitrate ion within the alkaline metals or alkaline-earth metals so as to purify the exhaust gas. The nitrate ion occluded in the alkaline metals or alkaline-earth metals is converted into $NO_2$ by the switching of the air-fuel ratio of an internal combustion engine to stoichiometric or rich burning, and then released outside the alkaline metals or alkaline-earth metals, whereby the catalyst is regenerated.

In contrast, a catalyst containing amorphous composite oxides that comprise alkaline metals or alkaline-earth metals selected from sodium, potassium, lithium, cesium and strontium, and titanium is known to capture NOx contained in exhaust gas from lean burning by chemically adsorbing NOx in the form of $NO_2$ onto the surface of the composite oxides, so as to purify the exhaust gas from lean burning. The $NO_2$ captured on the surface of the composite oxides is partially reduced to $N_2$ even in a lean atmosphere, and is also reduced to $N_2$ by the switching of the atmosphere to a stoichiometric or rich burning condition, whereby the catalyst is regenerated.

When heated at a high temperature of 800° C., the exhaust gas purification performance of the catalyst containing alkaline metals or alkaline-earth metals is decreased. This is inferred to be caused by the facts that alkaline metals or alkaline-earth metals migrate outside the carriers and move (sinter), and then the specific surface area decreases, which result in a drop in NOx-purification ability.

According to the present invention, a substance capable of suppressing the move of catalytically active components exists between carriers, so that catalytically active components become difficult to move and a decrease in the performance of exhaust gas purification can be prevented.

A common catalyst has a structure, wherein catalytically active components are supported inside the pores of the carriers. An exhaust gas purification catalyst for an internal combustion engine has carriers and catalytically active components on the surface of the substrate mainly having a monolith structure. Here the catalytically active component is supported on the carrier surface and involved in exhaust gas purification. Further, here the carrier is for supporting catalytically active components. A substance that suppresses the move of catalytically active components is hereinafter referred to as an anchoring material.

A desirable anchoring material does not have affinity or has poor affinity for catalytically active components that move outside the carrier. Material having good affinity is not preferable, because it promotes the move of catalytically active components. Further, a desirable anchoring material forms neither alloy nor composite oxide by reacting with catalytically active components that move from the carrier. The formation of alloys or composite oxides causes a decrease in the amount of catalytically active components and lowers the performance of purifying exhaust gas. Furthermore, a desirable anchoring material can maintain its initial form without melting in a temperature range within which the catalyst is used. Not only alkaline metals or alkaline-earth metals selected from sodium, potassium, lithium, cesium, strontium or barium, but also noble metals aggregate and undergo sintering, when heated at a high temperature. To prevent the above alkaline metals, alkaline-earth metals, or noble metals such as platinum, palladium, and rhodium from move outside the carrier, it is desirable to use at least one different kind of element, which is selected from the Ia, IIa, IIIa and IVa families in the long-period type periodic table as an anchoring material. Among these materials, magnesium oxide (MgO) or calcium oxide (CaO) is desirable, and MgO is particularly desirable.

The amount of an anchoring material selected from the Ia, IIa, IIIa and IVa families is desirably 1 to 20 parts by weight, particularly desirably 2.5 to 10 parts by weight, per 100 parts by weight of a carrier. Within these ranges, a high NOx conversion was obtained.

Materials for the carrier are desirably selected from porous inorganic oxides, and alumina is the most desirable because of its high heat resistance. In addition to such materials for the carrier, silica, a mixture of silica and alumina, zeolite, lanthanum.β alumina, which is a composite oxide of lanthanum and alumina, or the like can also be used. A normally used carrier has a particle size of between 0.5 and 80 μm, and has fine pores with a size of less than 0.01 μm on its surface. In the present invention, a carrier having such a particle size and a fine pore size is desirable for use. In addition, the pore size of the carrier can be found by measuring pore distribution according to a gas adsorption method using gas such as argon, nitrogen or krypton.

A desirable particle size for the anchoring material ranges from 0.01 μm to 60 μm. If the particle size of the anchoring material is too small or too large, lowered performance of NOx purification was observed. Further, not only spherical particles, but also particles of various forms can be used for the carrier and the anchoring material. Furthermore, in the present invention, a particle size is represented by a numerical value that is obtained by measuring the maximum and minimum particle sizes, adding them together, and then dividing by 2; that is, (minimum particle size+maximum particle size)/2.

Cordierite, metal or the like can be used as materials for the substrate. The metal is desirably a stainless metal. A desirable substrate has a monolith structure such as a honeycomb, and has several hundred cells, specifically 200 to 1200 cells, per inch.

The catalyst of the present invention desirably has at least one anchoring material and particularly desirably 3 to 20 anchoring materials per 100 μm×100 μm planar area. This enhances the functions of the anchoring material, and makes difficult for the performance of purifying exhaust gas to be lowered even after heating at a high temperature. In addition, the 100 μm×100 μm planar area refers to a rectangle with 100 μm-long sides, that is, square planar area. The number of particles and the particle size of the anchoring material can be measured by a high resolution scanning electron microscope (SEM), a light scattering method or the like. For example, an SEM photograph of a magnification of between 5 and 100,000 times is filmed, and then the particle size and the number of particles of the anchoring material in the photograph are measured.

A catalyst containing alkaline metals or alkaline-earth metals such as sodium, potassium, lithium, cesium, strontium and barium is employed as an NOx purification catalyst for an internal combustion engine, together with at least one kind of noble metal such as platinum, palladium and rhodium, rare earth metal such as cerium or lanthanum, titanium, manganese and the like.

The amount of alkaline metals or alkaline-earth metals is desirably, in total or otherwise, and in terms of the metal weight, 1 to 40 parts by weight per 100 parts by weight of a carrier. In the catalyst, alkaline metals and alkaline-earth metals exist in the state of oxides, carbonates, or amorphous composite oxides. There is an appropriate range for the amount of these alkaline metals or alkaline-earth metals. Deviation from the above range lowers the performance of NOx purification.

Since noble metals including platinum, rhodium and palladium have a function to reduce or oxidize NOx, they are elements essential for an exhaust gas purification catalyst. These noble metals exist in the form of oxide or metal after reduction of the oxide in a catalyst. Among noble metals, rhodium and platinum have a large effect of reducing captured NOx. Palladium has an effect of removing sulfur oxides (SOx). Accordingly, when SOx is contained in exhaust gas, a catalyst desirably contains three kinds: platinum, rhodium and palladium. When SOx is not contained or an extremely fine amount of SOx is contained in exhaust gas, a catalyst desirably contains two kinds: platinum and rhodium. The desirable content of a noble metal per 100 parts by weight of a carrier, in the case of platinum, is between 0.5 and 3 parts by weight, in the case of rhodium, between 0.05 and 0.3 parts by weight, and in the case of palladium, between 0.5 and 15 parts by weight. Within these ranges, a high performance of NOx purification could be obtained.

Titanium forms an amorphous composite oxide with at least one kind of alkaline metal or alkaline-earth metal selected from sodium, potassium, lithium, cesium and strontium. A desirable amount of titanium is between 1 and 8 parts by weight per 100 parts by weight of a carrier. Any content that is above or below this range lowers NOx purification performance. Further, titanium has resistance to SOx. When exhaust gas contains SOx, the catalyst desirably contains titanium.

Rare earth metals have an action to occlude oxygen. Rare earth metals contained in the catalyst promote the oxidation of nitrogen monoxides (NO) in exhaust gas into nitrogen dioxides ($NO_2$), thereby promoting the capturing of NOx by alkaline metals or alkaline-earth metals. As a rare earth metal, cerium is the most preferable. Rare earth metals exist in the form of oxide in the catalyst. A desirable amount of rare earth metals per 100 parts by weight of a carrier is in terms of the metal weight between 5 and 30 parts by weight, and in particular, between 15 and 20 parts by weight.

Manganese enhances the heat resistance of a catalyst, and it exists in the form of oxide in the catalyst. A desirable amount of manganese per 100 parts by weight of a carrier is in terms of the metal weight between 1.5 and 60 parts by weight.

According to an embodiment of the present invention, a catalyst used for purifying NOx contained in exhaust gas by contacting with exhaust gas from an internal combustion engine that is operated under a lean condition with an air-fuel ratio of 18 or more, wherein the catalyst has the following composition (1), (2) or (3), is provided:

(1) An exhaust gas purification catalyst having catalytically active components and carriers on the surface of a substrate having a monolith structure, in which,
the carrier comprises particles having fine pores on its surface; the catalytically active component has at least one kind of element selected from alkaline metals and alkaline-earth metals consisting of sodium, potassium, lithium, cesium, strontium and barium; at least one kind of particle selected from magnesium oxide and calcium oxide are provided between the above carrier particles; and at least one particle of the at least one kind selected from magnesium oxide and calcium oxide is contained in a square planar area with a 100 μm-long side.

(2) An exhaust gas purification catalyst having catalytically active components and carriers on the surface of a substrate having a monolith structure, in which,
the carrier comprises particles having fine pores on the surfaces of the particles; the catalytically active component comprises oxides or carbonates consisting of at least one kind selected from sodium, potassium, lithium, cesium, strontium and barium; at least one kind of noble metal selected from platinum, palladium and rhodium: at least one kind of magnesium oxide and calcium oxide is contained between the above carrier particles; and 1 to 20 parts by weight of the at least one kind of magnesium oxide and calcium oxide is contained per 100 parts by weight of the above carrier.

(3) An exhaust gas purification catalyst having catalytically active components and carriers on the surface of a substrate having a monolith structure, in which,
the catalytically active component comprises at least one kind selected from sodium, potassium, lithium, cesium and strontium, titanium, and at least one kind of noble metal selected from platinum, palladium and rhodium, and comprises amorphous composite oxides consisting of at least one kind selected from sodium, potassium, lithium, cesium and strontium, and titanium; the above carrier comprises particles that have fine pores on the surfaces of the particles; at least one kind selected from magnesium oxide and calcium oxide is provided between the above carrier particles; and the amount of the at least one kind of magnesium oxide and calcium oxide is between 1 and 20 parts by weight per 100 parts by weight of the above carrier.

According to another embodiment of the present invention, there is provided an internal combustion engine, which is provided with: an engine control unit that has an air-fuel ratio switching function to switch the air-fuel ratio between a lean, stoichiometric, and rich burning condition; and an exhaust gas purification catalyst for purifying NOx contained in engine exhaust gas, on condition that the internal combustion engine is composed so that is operated under a lean condition with an air-fuel ratio of 18 or more at a steady state, wherein at least one of the catalysts (1) to (3) above is provided at the exhaust gas flow path. Here "the steady state" means a case wherein a vehicle is traveling with fixed power such as urban driving, excluding a case wherein torque becomes necessary, such as upon acceleration or traveling on an expressway.

Further, according to another embodiment of the present invention, there is provided a method for purifying exhaust gas, which comprises allowing exhaust gas from an internal combustion engine that is operated under a lean condition having an air-fuel ratio of 18 or more to be in contact with any one of the catalysts (1) to (3) above, so as to purify NOx within the exhaust gas.

Furthermore, there is provided a method for purifying exhaust gas from an internal combustion engine, which comprises allowing exhaust gas from an internal combustion engine that is operated under a lean condition having an air-fuel ratio of 18 or more to be in contact with any one of the catalysts (1) to (3) above, and then switching the air-fuel ratio of the internal combustion engine to 14.7 or less to operate under a stoichiometric or rich burning condition, then allowing the exhaust gas to be in contact with the above catalyst.

The NOx-capturing abilities of the catalysts of (1) to (3) above are lowered as operation in a lean atmosphere is prolonged. However, when the atmosphere for the operation of the internal combustion engine is switched to a stoichiometric burning condition with an air-fuel ratio of 14.7 or a rich burning condition with an air-fuel ratio of less than 14.7, captured NOx is purified and the NOx-capturing ability is recovered. The time required for operating under a stoichiometric or a rich burning condition to recover the NOx-capturing ability is not more than several seconds. Specifically, a time of between 0.3 seconds and 5 minutes is sufficient.

According to another embodiment of the present invention, there is provided a method for preparing a catalyst, which comprises, coating the surface of a substrate that has a monolith structure with a slurry that contains carrier particles comprising inorganic oxides; drying and baking the substrate to form a coating layer that comprises the carriers on the substrate surface; and impregnating the substrate with a solution that contains at least one kind selected from alkaline metals and alkaline-earth metals consisting of sodium, potassium, lithium, cesium, strontium and barium, and at least one kind selected from noble metals consisting of platinum, palladium and rhodium; and then drying and baking to allow catalytically active components to be supported inside the pores of the above carriers, wherein, when the coating layer of the above carriers is formed, at least one kind selected from magnesium oxide particles and calcium oxide particles is mixed into the slurry containing the carriers, so that the above coating layer contains magnesium oxides or calcium oxides.

There is also provided a method for preparing a catalyst, which comprises:
coating the surface of a substrate having a monolith structure with a slurry that contains carrier particles comprising inorganic oxides; drying and baking the substrate to form a coating layer of the carriers on the substrate surface; impregnating the substrate with a solution that contains at least one kind selected from alkaline metals and alkaline-earth metals consisting of sodium, potassium, lithium, cesium and strontium, at least one kind selected from noble metals consisting of platinum, palladium and rhodium, and titanium; and then drying and baking to allow catalytically active components to be supported inside the pores of the above carriers, wherein, in the step to form the coating layer of the above carriers, at least one kind selected from magnesium oxide particles and calcium oxide particles is mixed into the slurry containing the carriers, so that the coating layer of the carriers contains magnesium oxides or calcium oxides, and in the step to support the above catalytically active components on the above carrier surface, additionally the substrate is impregnated with a solution that contains at least one kind selected from the alkaline metals and alkaline-earth metals and titanium, followed by drying and baking to form amorphous composite oxides consisting of the at least one of said alkaline metal or alkaline-earth metal, and titanium.

The melting point of MgO is as high as 2826° C. (source: The Chemical Society of Japan, ed., Chemistry Guidebook, Basics I (Kagaku-binran, kiso-hen I), 4th revised version, p. 169). Thus MgO is not easily softened or melted even when it is in contact with exhaust gas at approximately between 800° C. and 1000° C. Moreover, the electronegativity of the metal ion of MgO is 6.0 (source: Catalysis Society of Japan, ed., Catalytic Engineering Lecture 10 (Shokubai kogaku ko-za 10), p. 752), so that it cannot easily form an alloy or a composite oxide with sodium, potassium, lithium, cesium, strontium, or barium. Thus MgO is extremely suitable for anchoring material contains, if sodium, potassium, lithium, cesium, strontium or barium is contained as a catalytically active component. In addition, MgO has a low affinity also for noble metals, such as platinum.

When $MgAl_2O_3$ is used instead of MgO, the affinity with sodium, potassium, lithium, cesium, strontium, barium or the like is increased. As a result, Al components in $MgAl_2O_3$ react with the catalytically active components, i.e. alkaline metals or alkaline-earth metals, to form compounds with these metals. Accordingly, $MgAl_2O_3$ is not a desirable anchoring material. The specific surface area of a MgO particle is preferably between 0.1 and 100 $m^2/g$. To prevent active components such as noble metals from being supported onto the MgO surface, MgO particles particularly preferably have a specific surface areas of between 0.1 and 30 $m^2/g$.

The catalyst of the present invention is prepared by, most preferably, an impregnation method as described above. In addition to this method, the catalyst can also be prepared by a physical preparation method such as a kneading method, co-precipitation method, sol-gel method, ion exchange method, or vapor deposition method, or a preparation method using a chemical reaction.

As a starting raw material upon catalyst preparation, various compounds such as nitrate compounds, acetate compounds, chelate compounds, hydroxides, carbonate compounds, organic compounds, and dinitrodiamine complexes, metals, and metal oxides can be used.

BEST MODE FOR CARRYING OUT THE INVENTION

Figure 1:
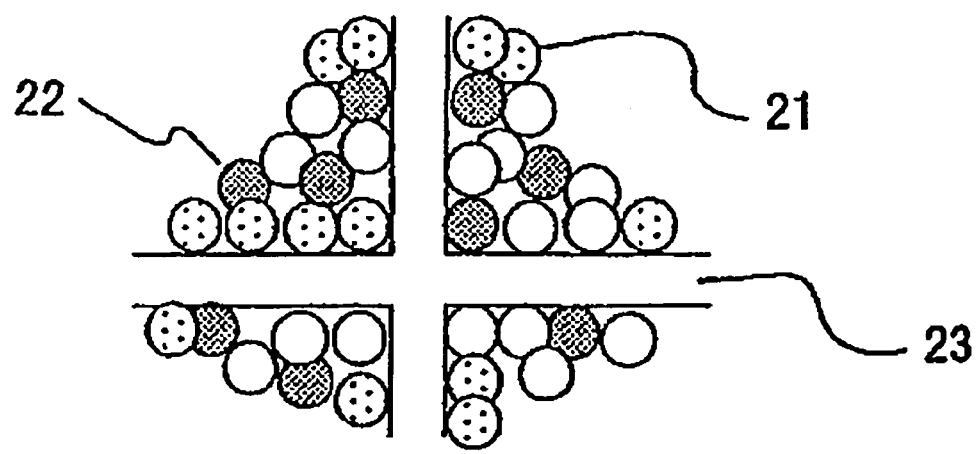
FIG. 1 is a schematic view showing the section of the catalyst of the present invention.
Figure 2:
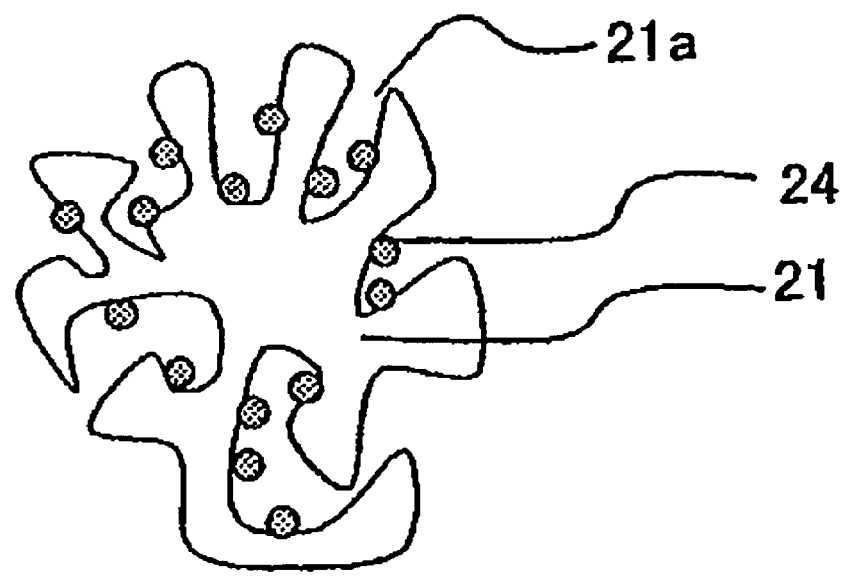
FIG. 2 is a schematic view showing the carrier that supports catalytically active components.

FIG. 1 shows a schematic view of the section of the exhaust gas purification catalyst of the present invention. This catalyst is composed of carriers 21 supporting catalytically active components, anchoring materials 22, and a substrate 23 having a monolith structure. FIG. 2 shows a schematic view of the section of the carrier 21 supporting catalytically active components. The carrier 21 has numerous fine pores 21a on the surface. On the fine pores 21a, catalytically active components 24 are supported.

Figure 3:
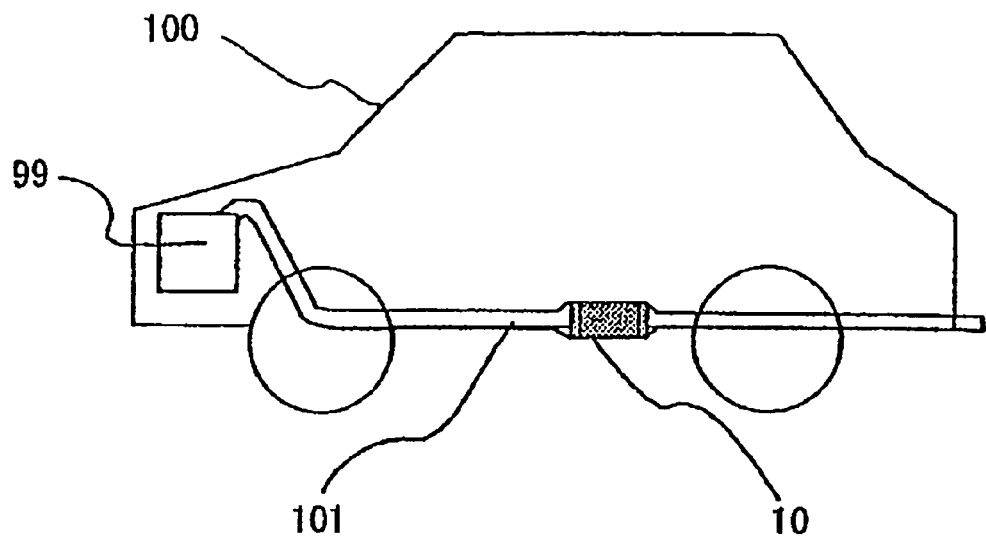
FIG. 3 is a rough diagram showing an automobile provided with the exhaust gas purification catalyst of the present invention.

FIG. 3 shows an automobile 100 that is provided with an exhaust gas purification catalyst 10 of the present invention. The exhaust gas purification catalyst 10 is disposed in an exhaust pipe 101 for releasing exhaust gas from an engine 99.

Figure 4:
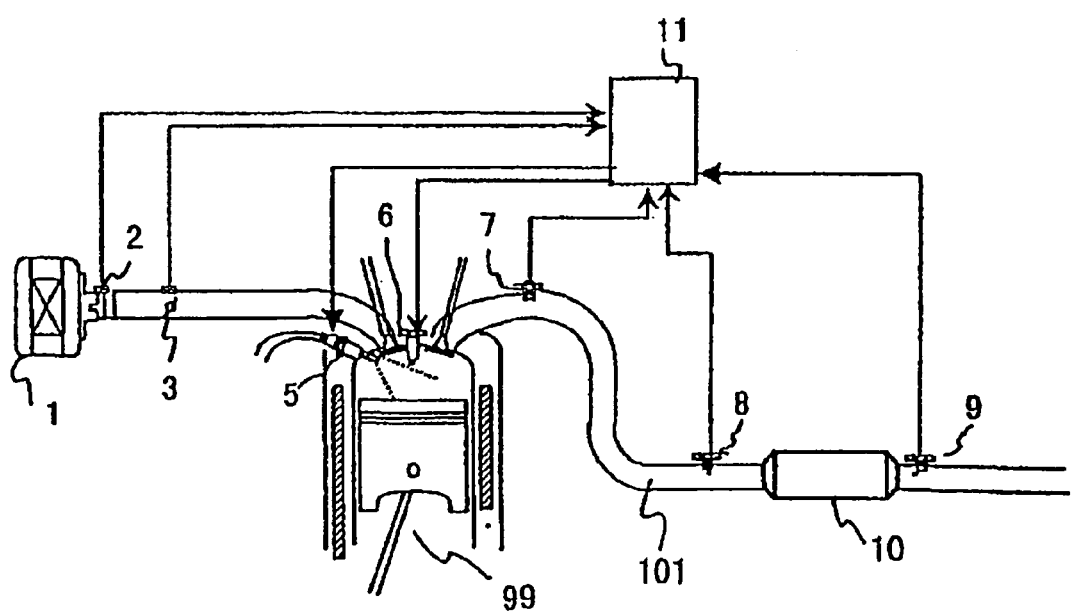
FIG. 4 is a rough diagram showing an internal combustion engine provided with the catalyst of the present invention and an engine control system.

FIG. 4 shows details about the engine 99 and the control unit in an internal combustion engine of an automobile or the like.

An air induction system for supplying air to the engine 99 is provided with an air cleaner 1, an air flow sensor 2, and a throttle valve 3. An exhaust system for releasing exhaust gas from burning in the engine 99 is provided with the exhaust pipe 101, an oxygen level sensor 7, an exhaust gas temperature sensor 8, a catalyst outlet gas temperature sensor 9, and the exhaust gas purification catalyst 10. Signals from these various sensors disposed in the induction system and the exhaust system of the engine 99 are sent to an engine control unit (ECU; Engine Control Unit) 11. ECU 11 is composed of I/O as an input and output interface, LSI, and processor MPU, storage units, RAM and ROM, wherein a number of control programs are stored, a timer counter and the like.

Air to be supplied to the engine 99 is filtered by the air cleaner 1, measured by the air flow sensor 2, passed through the throttle valve 3, exposed to fuel injection by an injector 5, and then supplied as air-fuel mixture to the engine 99.

ECU 11 receives signals from these various sensors, and evaluates the operation state of the internal combustion engine and the state of the exhaust gas purification catalyst to determine an air-fuel ratio for operation, and then sets the fuel concentration of the air-fuel mixture by controlling the injection time or the like of the injector 5. The air-fuel mixture induced by the cylinder of the engine 99 was ignited and burned by a spark plug 6 that is controlled by signals from ECU 11. The exhaust gas from burning is guided into the exhaust system, and then purified by the exhaust gas purification catalyst 10. Based on signals of the oxygen level sensor 7 that are inputted into ECU 11, the duration of a lean burning condition and the like, the NOx purification ability of the exhaust gas purification catalyst under the lean burning operation is determined. When the NOx capturing ability is estimated to be lower level than preset level, the air-fuel ratio is shifted to a stoichiometric or rich burning condition so as to recover the NOx capturing ability of the catalyst. After the stoichiometric or rich burning operation is performed for a certain time, the operation condition is switched back to a lean burning operation. In this manner, the air-fuel ratio is controlled by direction from the engine control unit, and the exhaust gas purification catalyst 10 is always kept under conditions wherein it can show good purification performance. In addition, an A/F sensor can also be used instead of the oxygen level sensor 7.

An example of controlling air-fuel ratio by managing the operation time of a lean burning condition and that of a stoichiometric or rich burning condition is as described above, but is not limited thereto. For example, a NOx level sensor is placed on the inlet side and the outlet side of the exhaust gas purification catalyst 10, if the performance of the catalyst is estimated to be lower level than preset level by means of the signals from these sensors, the air-fuel ratio may be switched.

EXAMPLES

Example 1

Example Catalyst 1

A mixed slurry, comprising alumina particles having numerous fine pores with pore sizes of less than 0.01 μm on the surface (particle size: 0.8 to 80 μm, average particle size: 30 μm), magnesium oxide particles as an anchoring material (particle size: 0.5 to 50 μm, average particle size: 15 μm, specific surface area: 1 $m^2$/g), and nitrate acidic alumina sol, was prepared. After the slurry was coated over a substrate of cordierite-made honeycomb (400 cells/$inc^2$), the substrate was dried and baked to form, on the honeycomb surface, a coating layer comprising alumina particles and anchoring materials. Here, the alumina sol is acting as an adhesive to adhere carriers and anchoring materials to the substrate. The amount of alumina is 190 g per litter of the apparent volume of the honeycomb, and the amount of magnesium oxide (MgO) is 10 g per litter of the apparent volume of the honeycomb. The amount of MgO per 100 parts by weight of the carrier is 5 parts by weight.

Then, catalytically active components were supported by the honeycomb having a coating layer comprising MgO and alumina, according to the following steps. First, the honeycomb was impregnated with a cerium nitrate aqueous solution, dried at 200° C. and baked at 600° C. for cerium oxides to be supported. Next, after impregnation with a mixed solution containing a dinitrodiammine platinum nitrate solution, rhodium nitrate, palladium nitrate, manganese nitrate, and potassium acetate, drying at 200° C. and baking at 600° C. were performed. Finally, impregnation with a mixed solution comprising potassium acetate, sodium nitrate, lithium nitrate and titania sol, drying at 200° C. and baking at 600° C. were performed. Thus, noble metals consisting of platinum, rhodium and palladium, and components consisting of manganese, potassium, sodium, lithium and titania were supported on the surface of the alumina carriers and also inside the fine pores. The amounts of catalytically active components supported therein per 100 parts by weight of the carrier are: 14.21 parts by weight of cerium, 0.07 part by weight of rhodium, 1.47 parts by weight of platinum, 0.74 part by weight of palladium, 7.21 parts by weight of manganese, 8.22 parts by weight of potassium, 6.53 parts by weight of sodium, 0.87 part by weight of lithium, and 2.26 parts by weight of titanium.

Comparative Example Catalyst 1

A comparative example catalyst 1 was prepared under the same conditions as those of the example catalyst 1, except that anchoring materials were not mixed into an alumina slurry.

Comparative Example Catalyst 2

An alumina coating layer was formed on a honeycomb made of cordierite using a slurry comprising alumina particles and nitrate acidic alumina sol. The amount of alumina was 190 g per litter of the apparent volume of honeycomb. Then, the honeycomb was impregnated with magnesium nitrate, dried at 200° C., and then baked at 600° C., whereby magnesium oxides were supported on the surface, including inside the pores of alumina. Then, by the same steps as the example catalyst 1, catalytically active components were supported. The amount of MgO per 100 parts by weight of the carrier was 5.26 parts by weight. The amount of catalytically active components supported herein was the same as that in Example 1.

Comparative Example Catalyst 3

A comparative example catalyst 3 was prepared similarly to the example catalyst 1, except that $MgAl_2O_4$ particles (particle size: 0.01 to 0.07 μm, average particle size: 0.03 μm, specific surface area: 55 $m^2$/g) were used instead of MgO. The amount of alumina per litter of the apparent volume of honeycomb was 190 g, and the amount of $MgAl_2O_4$ was 10 g.

Table 1 shows the amounts of various catalytically active components supported per litter of the apparent volume of honeycomb. In this table, a first component, second component and the like denote the order of supporting, i.e. the first component was supported first. The amount of the component supported per litter of the apparent volume of honeycomb is shown just before the supported component. For example, "27 Ce" means that 27 g of cerium was supported, in terms of the metal weight, per litter of the apparent volume of honeycomb.

TABLE 1

| Catalyst | Coating layer | First component | Second component | Third component | Fourth component |
|---|---|---|---|---|---|
| Example catalyst 1 | MgO-alumina mixture | 27 Ce | 0.14 Rh, 2.8 Pt, 1.4 Pd, 7.8 K, 13.7 Mn | 7.8 K, 12.4 Na, 1.65 Li, 4.3 Ti | None |
| Comparative example catalyst 1 | Alumina | 27 Ce | 0.14 Rh, 2.8 Pt, 1.4 Pd, 7.8 K, 13.7 Mn | 7.8 K, 12.4 Na, 1.65 Li, 4.3 Ti | None |
| Comparative example catalyst 2 | Alumina | 10 Mg | 27 Ce | 0.14 Rh, 2.8 Pt, 1.4 Pd, 7.8 K, 13.7 Mn | 7.8 K, 12.4 Na, 1.65 Li, 4.3 Ti |
| Comparative example catalyst 3 | $MgAl_2O_4$-alumina mixture | 27 Ce | 0.14 Rh, 2.8 Pt, 1.4 Pd, 7.8 K, 13.7 Mn | 7.8 K, 12.4 Na, 1.65 Li, 4.3 Ti | None |

Model Gas Flow Test

A test was conducted for the example catalyst 1, and the comparative example catalysts 1 to 3, wherein lean-burn model gas simulating exhaust gas from lean burning, and stoichiometric model gas simulating exhaust gas from stoichiometric burning alternately flowed.

The composition of the lean-burn model gas was: NOx: 600 ppm, $C_3H_6$: 500 ppm, CO: 0.1%, $CO_2$: 10%, $O_2$: 5%, $H_2O$: 10%, and $N_2$: remainder.

The composition of the stoichiometric model gas was: NOx: 1000 ppm, $C_3H_6$: 600 ppm, CO: 0.5%, $CO_2$: 5%, $O_2$: 0.5%, $H_2$: 0.3%, $H_2O$: 10%, and $N_2$: remainder.

The model gas flow test is as follows.
(1) Stoichiometric model gas heated at 500° C. was made to flow for 3 minutes, and then lean-burn model gas heated at 500° C. was made to flow for 3 minutes. A cycle consisting of these steps was repeated 3 times.
(2) After the above cycles, stoichimetric model gas heated at 400° C. and lean-burn model gas heated at 400° C. were made to flow alternately in the same way for 3 minutes each. A cycle consisting of these steps was repeated 3 times.
(3) After the above cycles, stoichiometric model gas heated at 350° C. and lean-burn model gas heated at 350° C. were made to flow alternately for 3 minutes each. A cycle consisting of these steps was repeated 3 times.
(4) Further, stoichiometric model gas heated at 300° C. and lean-burn model gas heated at 300° C. were made to flow alternately for 3 minutes each. A cycle consisting of these steps was repeated 3 times.
(5) The catalyst subjected to the above cycles was put in an electric furnace, and then heated at 830° C. for 60 hours.
(6) Cycles (1) were performed again.
(7) Cycles (2) were performed again.
(8) Cycles (3) were performed again.
(9) Cycles (4) were performed again.

In addition, the volume of a catalyst was 6 cc, and SV was 30,000/h.

The NOx conversion was measured by the following equation during the above model gas flow test.

NOx conversion=(NOx concentration before passing through the catalyst layer −NOx concentration after passing through the catalyst layer)/(NOx concentration before passing through the catalyst layer)×100

Test Result

Table 2 shows NOx conversions (initial NOx conversion) as measured during cycles (2), and NOx conversion (NOx conversion at 400° C. after heat treatment) as measured during the cycles (7). Both rates were measured after the lean model gas at the second cycle flowed for 1 minute. The example catalyst 1 showed a less decrease in NOx conversion after heat treatment compared to the comparative example catalysts 1 to 3, revealing that the example catalyst 1 has better heat resistance.

Table 3 shows NOx conversion of the example catalyst 1 and the comparative example catalyst 1 during cycles of each (6), (8) and (9). All the NOx conversion were measured after the lean model gas at the second cycle flowed for 1 minute. Compared to the comparative example catalyst 1, the example catalyst 1 has a higher NOx conversion after heat treatment and thus has better heat resistance.

Further, in the examples to be described later, when referred to "NOx conversion at 400° C. after heat treatment", the value was measured after the lean model gas at the second cycle in the cycles (7) flowed for 1 minute.

TABLE 2

| Catalyst | Initial NOx conversion [%] | NOx conversion [%] at 400° C. after heat treatment |
| --- | --- | --- |
| Example catalyst 1 | 98 | 80 |
| Comparative example catalyst 1 | 95 | 52 |
| Comparative example catalyst 2 | 95 | 53 |
| Comparative example catalyst 3 | 92 | 45 |

TABLE 3

| Catalyst | NOx conversion (%) at 300° C. after heat treatment | NOx conversion (%) at 350° C. after heat treatment | NOx conversion (%) at 500° C. after heat treatment |
| --- | --- | --- | --- |
| Example catalyst 1 | 67 | 78 | 40 |
| Comparative example catalyst 1 | 43 | 59 | 29 |

Observation of Coating Layer

For the example catalyst 1, the state of a coating layer was observed using an energy dispersive (EDX)—high resolution scanning electron microscope (SEM) at a stage when the coating layer comprising alumina and anchoring materials was formed on a honeycomb made of cordierite. MgO particles within the coating layer can be specified by EDX measurement. Further, the structure of the anchoring materials (Mg) in the coating layer was confirmed by X-ray diffraction (XRD) measurement.

When the coating layer was measured by powder X-ray diffraction (XRD), only $Al_2O_3$ and MgO were detected. Moreover, distribution of Mg and that of Al were observed independently by EDX-SEM measurement on the coating layer. Hence, it is obvious that MgO and $Al_2O_3$ exist independently.

Further, for the portions measured by EDX and by SEM, MgO particles having a particle size of approximately 15 μm were confirmed to be present in the coating layer.

As described above, the coating layer was confirmed to comprise $Al_2O_3$ and MgO particles.

Example 2

Figure 5:
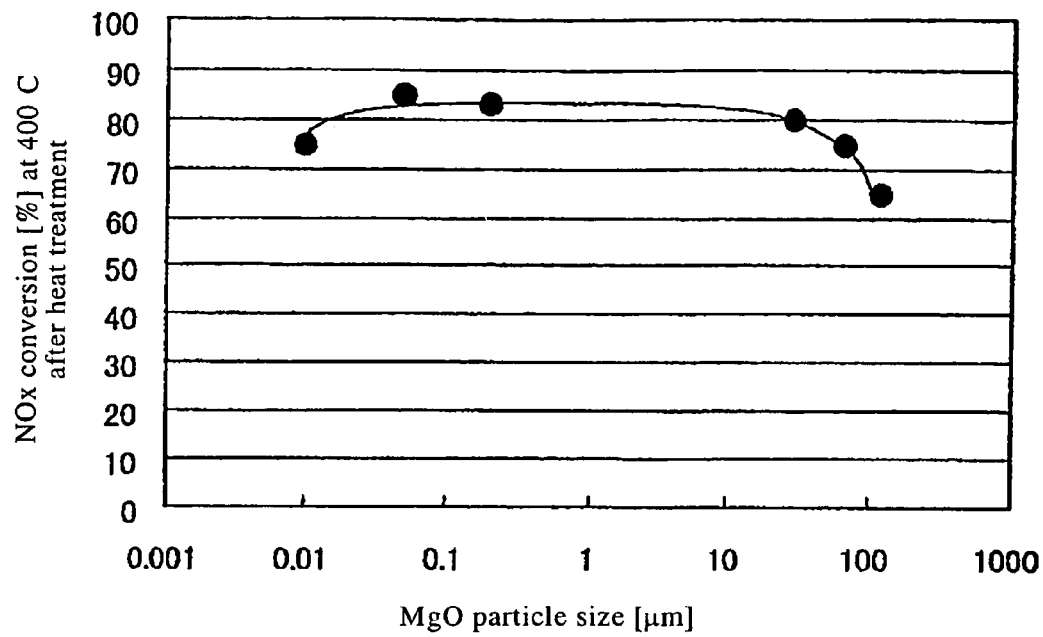
FIG. 5 is a graph showing the correlation between the particle size of a MgO particle and the NOx conversion at 400° C. after heat treatment.

In the example catalyst 1, the particle size of MgO (anchoring material) was varied. The particle sizes of MgO particles were sieved by sizes of between 0.01 and 0.02 μm, 0.05 and 0.06 μm, 0.20 and 0.21 μm, 29 and 30 μm, 59 and 60 μm, and 99 and 100 μm, respectively. A catalyst was prepared in a manner similar to that for the example catalyst 1. The composition of the catalytic components is the same as that of the example catalyst 1. FIG. 5 shows the correlation between the particle size of a MgO particle and NOx conversion at 400° C.

after heat treatment. When the particle size of MgO particle was between 0.01 and 60 μm, high NOx conversion were obtained.

Example 3

Figure 6:
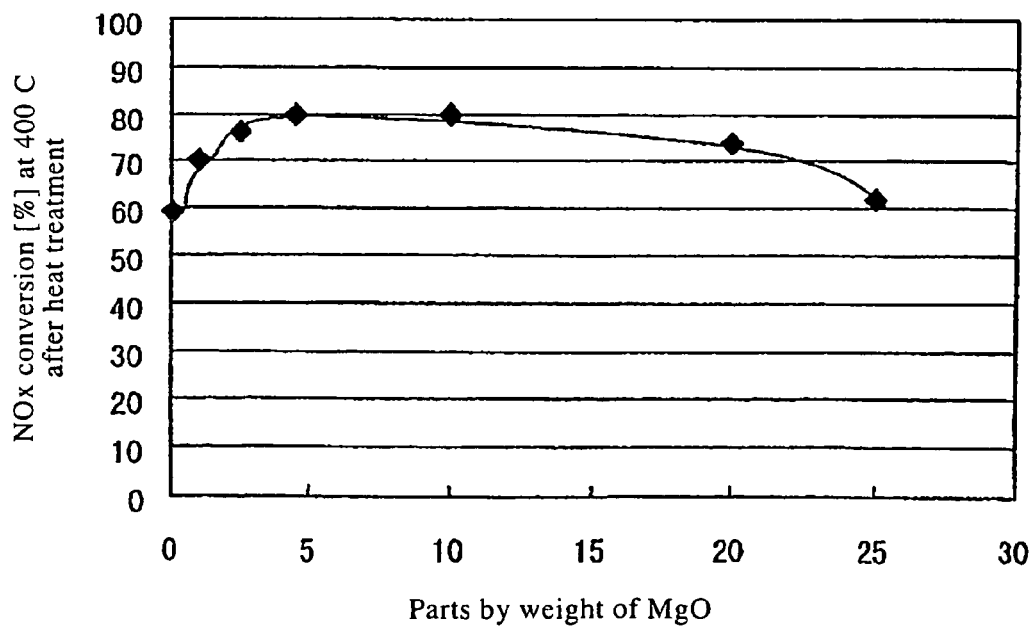
FIG. 6 is a graph showing the correlation between MgO levels in the carrier and the NOx conversion at 400° C. after heat treatment.

Catalysts were prepared in a manner similar to that for the example catalyst 1. The weights of MgO per 100 parts by weight of alumina within the catalysts were: 0.5 parts by weight, 1.0 part by weight, 2.5 parts by weight, 4.5 parts by weight, 10 parts by weight, 20 parts by weight, and 25 parts by weight, respectively. The kinds and the amounts of catalytically active components to be supported were the same as those of the example catalyst 1. FIG. 6 shows the correlation between NOx conversion at 400° C. after heat treatment, and the weight of MgO particles. When the MgO particle level per 100 parts by weight of alumina was in the range of between 1 and 20 parts by weight, high NOx conversion were obtained.

Example 4

The presence of MgO particles between carriers suppresses the alkali attack. This was verified by XRD and Fourier transform infrared absorption measurement (FT-IR).

Upon verification, a cordierite-made honeycomb was impregnated with sodium in an amount equivalent to that of the example catalyst 1, and then baked by heating at 900° C. in air for 7.5 hours. The sodium-supporting cordierite was crushed, and then subjected to XRD measurement. Further, the crushed particles were measured by FT-IR at room temperature under helium flow.

As a result of XRD measurement, $NaAlSiO_4$ was observed, and sodium was shown to react with cordierite (composite oxides of $2MgO.2Al_2O_3.5SiO_2$) to form an alkali aluminosilicate which cause the alkali attack. Further, as a result of FT-IR measurement, infrared absorption occurred at a wavenumber of 1280 $cm^1$, at which no infrared absorption was obtained when only the cordierite particles were used.

The example catalyst 1 and the comparative example catalyst 1 were also crushed at a stage when all the cycles (1) to (9) in Example 1 had been completed, and then subjected to FT-IR measurement. Table 4 shows the results. In addition, in this example, infrared absorption intensity of alkali aluminosilicate was defined as follows.

(Infrared absorption intensity of alkali aluminosilicate)=(Infrared absorption intensity of sample measured at 1280 $cm^{-1}$)–(Infrared absorption intensity of cordierite at 1280 $cm^-$)

Samples with higher absorption intensities of alkali aluminosilicate resulted in greater amounts of alkali aluminosilicate formed.

Alkali aluminosilicate formation proceeded in the comparative example catalyst 1 that had been coated only with alumina. In contrast, the example catalyst 1 that had been coated with the mixture of alumina and MgO showed greatly suppressed alkali aluminosilicate formation.

TABLE 4

| Sample | Infrared absorption intensity of alkali aluminosilicate |
| --- | --- |
| Na-supporting cordierite | 0.28 |
| Comparative example catalyst 1 | 0.20 |
| Example catalyst 1 | 0.05 |

Example 5

The cordierite-made honeycomb substrate of the example catalyst 1 was replaced by a metal honeycomb. According to Example 1, NOx conversion was measured at 400° C. and at 500° C. after heat treatment. Table 5 shows the results.

Replacement of the substrate material by the metal honeycomb further improved the heat resistance.

TABLE 5

| Substrate material | NOx conversion (%) at 400° C. after heat treatment | NOx conversion (%) at 500° C. after heat treatment |
| --- | --- | --- |
| Cordierite | 80 | 40 |
| Metal | 90 | 95 |

Example 6

A catalyst was prepared similarly to the example catalyst 1, except that the anchoring material of the example catalyst 1 was replaced by calcium oxide (CaO). 5 parts by weight of CaO were used per 100 parts by weight of a carrier. In accordance with Example 1, NOx conversion was measured at 400° C. after heat treatment. Thus, an approximately 70% NOx conversion was obtained.

As described above, anchoring materials provided between carriers can ease a decrease in the catalyst's performance of purifying exhaust gas after the catalyst has been heated to high temperatures.

INDUSTRIAL APPLICABILITY

The catalyst of the present invention has good heat resistance, and has an effect of capable of maintaining high catalytic activity even after being heated to high temperatures. Thus, the catalyst is preferable for purifying exhaust gas from an automobile at high temperatures.

The invention claimed is:

1. An exhaust gas purification catalyst for purifying NOx contained in exhaust gas when the catalyst comes into contact with the heated exhaust gas,
   which is provided with carriers and catalytically active components that are supported by the carriers; and contains, in the catalytically active components, thermal moving components that may move due to exhaust gas heat,
   wherein a moving-suppressing substance that inhibits the moving of the thermal moving components is provided between the carriers;
   the moving-suppressing substance comprises particles that consist of at least one kind selected from magnesium oxide and calcium oxide;
   the particle size of the moving-suppressing substance ranges from 0.01 μm to 60 μm; and
   the moving-suppressing substance has specific surface areas between 0.1 and 30 $m^2/g$.

2. The exhaust gas purification catalyst according to claim 1, wherein the thermal moving components are at least one kind selected from alkali metals, alkaline earth metals and noble metals.

3. The exhaust gas purification catalyst according to claim 1, which contains at least one particle of the moving-suppressing substance within a rectangle planar area with a 100 μm-long side.

4. The exhaust gas purification catalyst according to claim 3, which has the carriers, the catalytically active components, and the moving-suppressing substance on the surface of a substrate having a monolith structure.

5. The exhaust purification catalyst according to claim 1 for purifying NOx contained in exhaust gas when the catalyst comes into contact with the heated exhaust gas coming from an internal combustion engine that is operated under a lean condition of an air-fuel ratio of 18 or more, which has catalytically active components and carriers on the surface of a substrate having a monolith structure and contains, within the catalytically active component, at least one kind of element selected from alkali metals and alkaline-earth metals consisting of sodium, potassium, lithium, cesium, strontium and barium, wherein the moving-suppressing substance is contained between the carriers per 100 μm×100 μm planar area of the finally obtained catalyst.

6. The exhaust gas purification catalyst according to claim 1 for purifying NOx contained in exhaust gas when the catalyst comes into contact with the heated exhaust gas coming from an internal combustion engine that is operated under a lean condition of an air-fuel ratio of 18 or more, which has, on the surface of a substrate having a monolith structure, carriers and catalytically active components comprising oxides or carbonates of at least one kind selected from sodium, potassium, lithium, cesium, strontium and barium, and at least one kind of noble metal selected from platinum, palladium and rhodium, wherein the moving-suppressing substance is provided between the carriers, and 1 to 20 parts by weight of the moving-suppressing substance is contained per 100 parts by weight of the carrier.

7. The exhaust gas purification catalyst according to claim 1 for purifying NOx contained in exhaust gas when the catalyst comes into contact with the heated exhaust gas coming from an internal combustion engine that is operated under a lean condition of an air-fuel ratio of 18 or more, which has, on the surface of a substrate having a monolith structure, carriers and catalytically active components comprising oxides or carbonates of at least one kind selected from sodium, potassium, lithium, cesium and strontium, at least one kind of noble metal selected from platinum, palladium and rhodium, and composite oxides of titanium and at least one kind selected from sodium, potassium, lithium, cesium and strontium, wherein the moving-suppressing substance is provided between the carriers, and 1 to 20 parts by weight of the moving-suppressing substance is contained per 100 parts by weight of the carrier.

\* \* \* \* \*